United States Patent
Lin et al.

(10) Patent No.: US 11,226,589 B2
(45) Date of Patent: Jan. 18, 2022

(54) HOLOGRAPHIC IMAGE FILM, AND HOLOGRAPHIC IMAGE RECORDING METHOD AND RECONSTRUCTION METHOD

(71) Applicant: inFilm Optoelectronic Inc., Grand Cayman (KY)

(72) Inventors: Chih-Hsiung Lin, Grand Cayman (KY); Chih-Chieh Chang, Grand Cayman (KY)

(73) Assignee: inFilm Optoelectronic Inc., Grand Cayman (KY)

( * ) Notice: Subject to any disclaimer, the term of this patent is extended or adjusted under 35 U.S.C. 154(b) by 256 days.

(21) Appl. No.: 16/562,573

(22) Filed: Sep. 6, 2019

(65) Prior Publication Data

US 2020/0081399 A1    Mar. 12, 2020

(30) Foreign Application Priority Data

Sep. 10, 2018   (CN) .......................... 201811049271.0

(51) Int. Cl.
   *G03H 1/04*   (2006.01)
   *G03H 1/22*   (2006.01)

(52) U.S. Cl.
   CPC ......... *G03H 1/0408* (2013.01); *G03H 1/2202* (2013.01); *G03H 2001/0428* (2013.01); *G03H 2001/2226* (2013.01)

(58) Field of Classification Search
   None
   See application file for complete search history.

(56) References Cited

U.S. PATENT DOCUMENTS

| | | | | |
|---|---|---|---|---|
| 4,643,515 A | * | 2/1987 | Upatnieks ............ | G03H 1/0408 359/10 |
| 5,515,184 A | * | 5/1996 | Caulfield ............... | G02B 6/005 359/34 |
| 5,710,645 A | * | 1/1998 | Phillips ................ | G03H 1/0408 359/1 |

(Continued)

FOREIGN PATENT DOCUMENTS

| | | |
|---|---|---|
| EP | 3321745 A1 | 5/2018 |
| TW | M428387 U | 5/2012 |

(Continued)

*Primary Examiner* — Derek S. Chapel
(74) *Attorney, Agent, or Firm* — Rabin & Berdo, P.C.

(57) ABSTRACT

A holographic image film, and a holographic image recording method and reconstruction method are provided. The holographic image recording method includes a preparation step, an irradiation step and a recording step. The preparation step includes stacking a holographic negative film on a transparent substrate. The irradiation step includes emitting object light and reference light. The reference light is emitted into the transparent substrate and undergoes multiple times of total reflections in a thickness of the transparent substrate to form total internal reflected light. The recording step includes generating a holographic image interference line by a mutual interference between the total internal reflected light and the object light, and recording the holographic image interference line on the holographic negative film in a photosensitive manner.

11 Claims, 5 Drawing Sheets

(56) References Cited

U.S. PATENT DOCUMENTS

| | | | | |
|---|---|---|---|---|
| 6,301,026 B1* | 10/2001 | Ueda | ........................ | G02B 5/32 |
| | | | | 359/15 |
| 2016/0033710 A1* | 2/2016 | Kim | ....................... | G02B 6/005 |
| | | | | 362/602 |
| 2020/0183328 A1* | 6/2020 | Studeny | ................. | B60Q 1/302 |

FOREIGN PATENT DOCUMENTS

| TW | 201612585 A | 4/2016 |
|---|---|---|
| WO | 2014031117 A1 | 2/2014 |
| WO | 2017033975 A1 | 3/2017 |
| WO | 2018050362 A1 | 3/2018 |
| WO | 2018157713 A1 | 9/2018 |

\* cited by examiner

HOLOGRAPHIC IMAGE FILM, AND HOLOGRAPHIC IMAGE RECORDING METHOD AND RECONSTRUCTION METHOD

CROSS-REFERENCE TO RELATED APPLICATION

This non-provisional application claims priority under 35 U.S.C. § 119(a) to Patent Application No. 201811049271.0 filed in China, P.R.C. on Sep. 10, 2018, the entire contents of which are hereby incorporated by reference.

BACKGROUND

Technical Field

The instant disclosure relates to image recording and reconstruction methods, and more particularly relates to a holographic image film and a holographic image recording method and reconstruction method.

Related Art

Holography is a photographic technique that records information (such as amplitude and phase) in light waves (such as reflected light waves or transmitted light waves) generated by an object, and light reflected or transmitted by the object can be completely reconstructed by a recording negative film to generate a holographic image corresponding to the object.

As shown in FIG. 1, a current known way to manufacture an optical holographic film is that image capturing equipment 10P such as a CCD (Charge Coupled Device) camera is used to capture an image of an object 12P on a placement platform 11P and display the image on a display screen 13P, and meanwhile, a light-emitting device 14P is used to emit light to a first reflector 15P so as to reflect the light to a beam splitter 16P and split the light into two light beams; one of the light beams is a reference light which is transmitted to a second reflector 17P and reflected by the second reflector 17P to irradiate the surface of a holographic negative film 18P; the other light beam is transmitted to a third reflector 19P and reflected by the third reflector 19P to the display screen 13P and then is transmitted to generate object light which irradiates the same surface of the holographic negative film 18P as the reference light; and the object light and the reference light have a mutual optical interference so as to be recorded on the holographic negative film 18P.

However, when the holographic negative film 18P manufactured in the current way is subjected to holographic image reconstruction, a reconstruction light source must be arranged at a height position away from the holographic negative film 18P, so as to irradiate the holographic negative film 18P from a distance to generate a holographic image corresponding to the object 12P, thereby causing that the volume and thickness of a holographic image reconstruction device may not be further reduced.

SUMMARY

In view of the above, in one embodiment, a holographic image recording method is provided, comprising a preparation step: stacking a holographic negative film on a transparent substrate, wherein the transparent substrate comprises a first surface, a second surface and a light entering area, the first surface and the second surface are spaced from each other by a thickness, and the holographic negative film is stacked on the first surface or the second surface; an irradiation step: emitting object light and reference light, wherein the object light irradiates the first surface of the transparent substrate, and the reference light irradiates the light entering area to enter the transparent substrate and undergoes multiple times of total reflections in the thickness to form total internal reflected light; and a recording step: generating a holographic image interference line by a mutual interference between the total internal reflected light and the object light, and recording the holographic image interference line on the holographic negative film in a photosensitive manner.

In one embodiment, a holographic image film is provided, comprising a holographic layer. The holographic layer records the holographic image interference line on the holographic negative film manufactured in the above holographic image recording method.

In one embodiment, a holographic image reconstruction method is provided, comprising a preprocessing step: preparing a holographic image film, wherein the holographic image film comprises a light transmission layer and a holographic layer, the light transmission layer comprises a first surface, a second surface and an incident area, the first surface and the second surface are spaced from each other by a height, and the holographic layer is stacked on the first surface or the second surface and records a holographic image interference line; a reconstruction step: emitting a reconstruction light into the light transmission layer through the incident area, and performing multiple times of total reflections in the height to form total internal reflected light; and an imaging step: irradiating, by the total internal reflected light, the holographic image interference line to form a holographic image.

Based on the above, according to the holographic image recording method of the embodiment of the instant disclosure, the reference light is emitted into the transparent substrate and undergoes multiple times of total reflections to form the total internal reflected light, and the total internal reflected light and the object light have a mutual interference to generate the holographic image interference line which is recorded on the holographic negative film in the photosensitive manner, so that during the subsequent reconstruction, the holographic image may be reconstructed through the total internal reflected light without considering a height position of a reconstruction light source, the volume and thickness of a holographic image reconstruction device are greatly reduced, and the holographic image reconstruction device is thinner.

DETAILED DESCRIPTION

Figure 1:
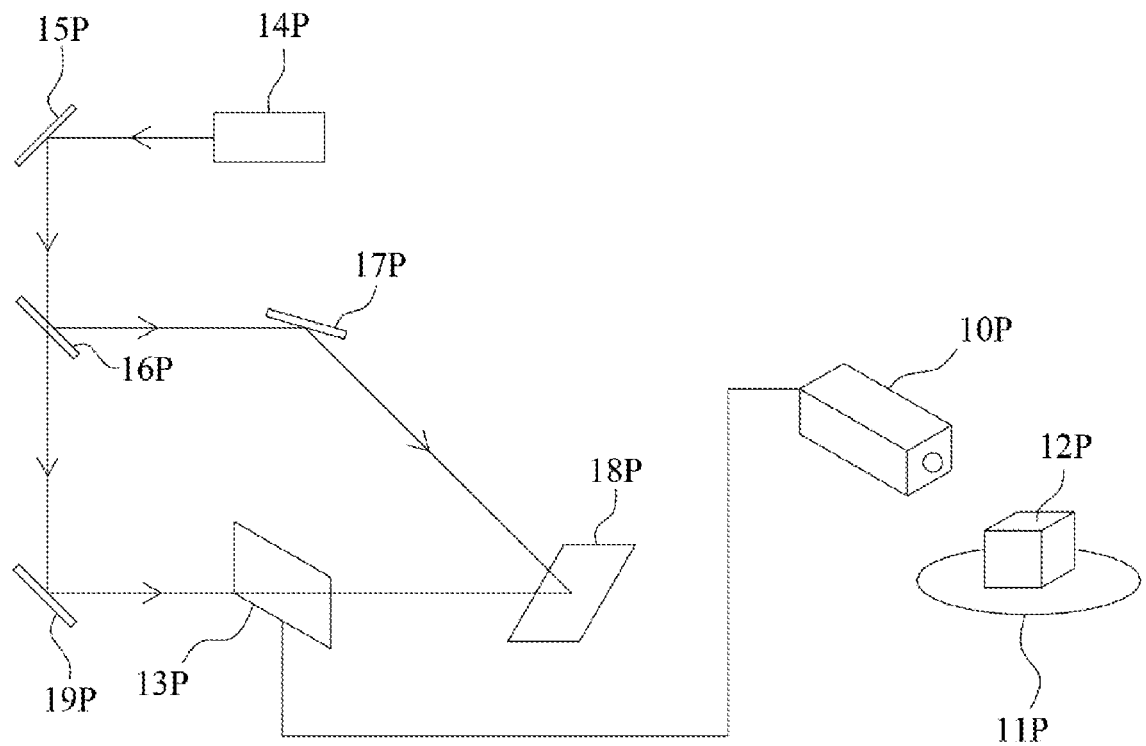
FIG. 1 is a recording schematic diagram of one embodiment of an existing holographic image recording method.
Figure 2:
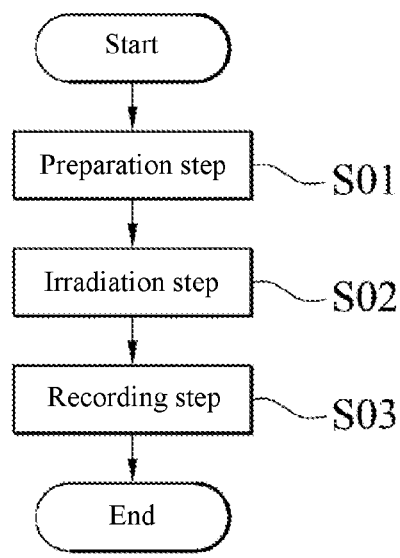
FIG. 2 is a step flowchart of one embodiment of a holographic image recording method of the instant disclosure.

FIG. 2 is a step flowchart of one embodiment of a holographic image recording method of the instant disclosure. The holographic image recording method is used to record an image and information (such as amplitude and phase) of a target object on a negative film, so that the image of the target object may reappear through the negative film subsequently. As shown in FIG. 2, the holographic image recording method of the present embodiment comprises a preparation step S01, an irradiation step S02 and a recording step S03. In some embodiments, all the steps of the above holographic image recording method may be executed by a holographic image recording device 1, and detailed steps of the holographic image recording method are described below in combination with the drawings.

Figure 3:
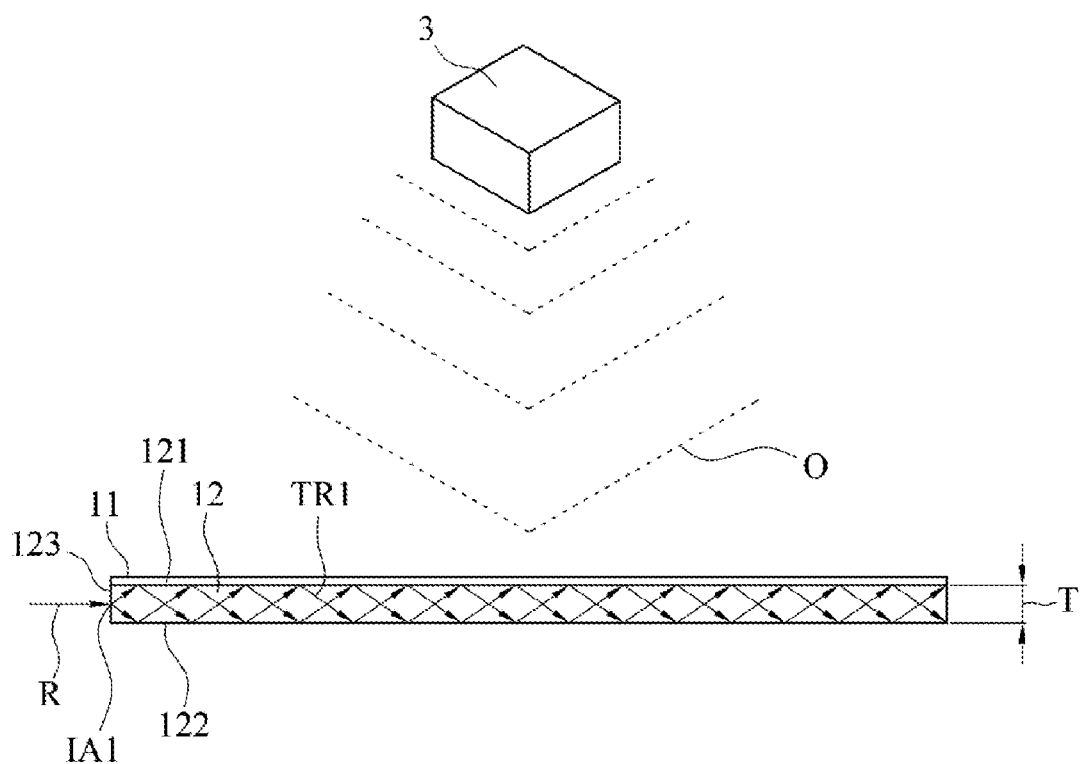
FIG. 3 is a recording schematic diagram of one embodiment of a holographic image recording method of the instant disclosure.

As shown in FIG. 2, in the preparation step S01, firstly, a holographic negative film 11 is stacked on a transparent substrate 12. For example, as shown in FIG. 3, in the present embodiment, the transparent substrate 12 comprises a first surface 121 and a second surface 122 which are opposite. The first surface 121 and the second surface 122 are spaced from each other by a thickness T. That is, the transparent substrate 12 is a plate body having a thickness T. In the present embodiment, the holographic negative film 11 is stacked on the first surface 121, but the instant disclosure is not limited thereto. The holographic negative film 11 is also stacked on the second surface 122. Moreover, the transparent substrate 12 also comprises a side surface 123 and a light entering area IA1. The side surface 123 is connected with the outer circumferences of the first surface 121 and the second surface 122. That is, the side surface 123 is an outer circumferential surface of the transparent substrate 12. In some embodiments, the light entering area IA1 may be arranged on the first surface 121, the second surface 122 or the side surface 123. For example, the light entering area IA1 is a partial surface of the first surface 121, the second surface 122 or the side surface 123.

In some embodiments, the transparent substrate 12 may be specifically made of a light guide material. For example, the transparent substrate 12 may be made of polycarbonate (PC), acrylic plastic (PMMA) or glass, and thus has a light guide function. The transparent substrate 12 may be a hard light guide plate or a flexible soft light guide sheet, but the instant disclosure is not limited thereto. In some embodiments, the holographic negative film 11 may be specifically made of a photosensitive material (such as silver halide, a photoresist and a photopolymer), and is used to record an interference line generated by a light wave. For example, the holographic negative film 11 may be a rainbow holographic film, a reflective holographic film, a multi-view holographic film, a true color holographic film or an integrated holographic film, but the instant disclosure is not limited thereto.

As shown in FIG. 2, after the preparation step S01, the irradiation step S02 may be executed: object light O and reference light R are emitted. The object light O and the reference light R may be coherent light beams. That is, the object light O and the reference light R have coherence, but the instant disclosure is not limited thereto. The object light O and the reference light R also may be non-coherent light. As shown in FIG. 3, in the present embodiment, the light entering area IA1 of the transparent substrate 12 is arranged on the side surface 123, and the reference light R is emitted into the transparent substrate 12 from the light entering area IA1 and undergoes multiple times of total internal reflections (TIR) in the thickness T of the transparent substrate 12 to form total internal reflected light TR1. The total internal reflected light TR1 herein is a sawtooth-shaped reflection path. In some embodiments, the reference light R also may be emitted into the transparent substrate 12 from the first surface 121, the second surface 122 or a corner of the transparent substrate 12, and the present embodiment is not limited thereto. In some embodiments, the thickness T of the transparent substrate 12 is preferably equal to or greater than the double of a wavelength of the reference light R, so that the reference light R may undergo the total reflection in the thickness T of the transparent substrate 12 more smoothly.

As shown in FIG. 3, the target object 3 may be located on the side, close to the first surface 121, of the transparent substrate 12, so as to emit the object light O to irradiate the first surface 121 of the transparent substrate 12. In some embodiments, the target object 3 may be an entity object, a digital image or a self-luminous object (such as a lamp or a display screen), and the instant disclosure is not limited thereto.

Figure 5:
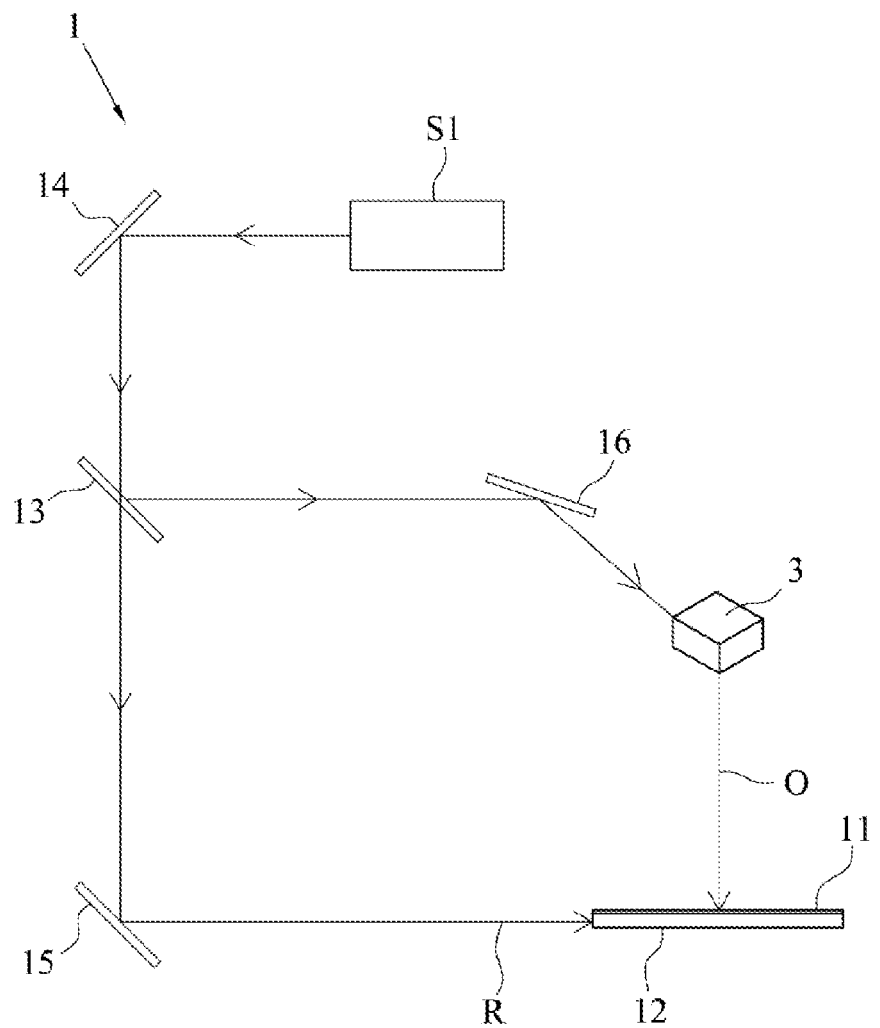
FIG. 5 is a recording schematic diagram of another embodiment of a holographic image recording method of the instant disclosure.

In some embodiments, the object light O and the reference light R may be formed via various different light paths. For example, referring to FIGS. 3 and 5, in the present embodiment, the object 3 is the entity object, and the holographic image recording device 1 may comprise a light-emitting unit S1, a beam splitter 13, a first reflector 14, a second reflector 15 and a third reflector 16. The light-emitting unit S1 may emit light to the first reflector 14, so as to reflect the light to the beam splitter 13 and split the light into two light beams. One of the light beams is the reference light R which is transmitted to the second reflector 15 and reflected by the second reflector 15 to enter the transparent substrate 12 from one side of the transparent substrate 12 and undergoes multiple times of total internal reflections in the transparent substrate 12 to form total internal reflected light TR1. The other light beam is reflected and transmitted to the third reflector 16 and reflected by the third reflector 16 to the target object 3 to reflect and emit an object light O wavefront which irradiates the first surface 121 of the transparent substrate 12. However, the light path of the above embodiment of FIG. 5 is only an example, and not intended to limit the way to form the object light O and the reference light R. For example, the positions and directions of the light-emitting unit S1, the beam splitter 13, the first reflector 14, the second reflector 15 and the third reflector 16 of the holographic image recording device 1 may have different configurations to form different light paths. Or, the object light O and the reference light R also may be formed by two different light sources.

Figure 6:
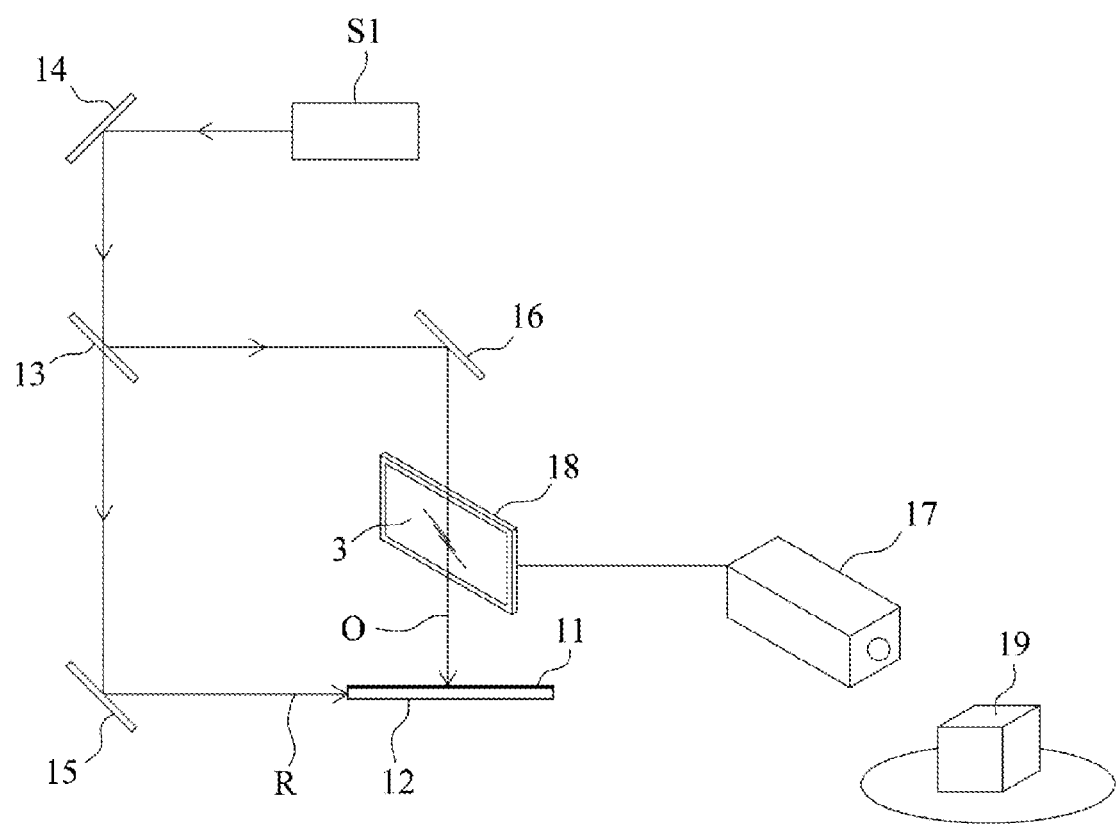
FIG. 6 is a recording schematic diagram of another embodiment of a holographic image recording method of the instant disclosure.

In another embodiment, as shown in FIG. 6, the target object 3 also may be the digital image. For example, in the present embodiment, the holographic image recording device 1 comprises a light-emitting unit S1, a beam splitter 13, a first reflector 14, a second reflector 15, a third reflector 16, a camera device 17 and a display panel 18. The digital image (namely the target object 3) is an image of an entity object 19, captured by the camera device 17 (such as a CCD camera) and displayed on the display panel 18 (such as a liquid crystal display screen). The light-emitting unit S1 may emit light to the first reflector 14, so as to reflect the light to the beam splitter 13 and split the light into two light beams. One of the light beams is the reference light R which is transmitted to the second reflector 15 and reflected by the second reflector 15 to enter the transparent substrate 12 from one side of the transparent substrate 12 and undergoes multiple times of total internal reflections in the transparent substrate 12 to form total internal reflected light TR1 (as shown in FIG. 3). The other light beam is reflected and transmitted to the third reflector 16 and reflected and transmitted by the third reflector 16 to the display panel 18 to transmit and form the object light O which irradiates the first surface 121 of the transparent substrate 12. However, the light path of the above embodiment of FIG. 6 is only an example, and not intended to limit the way to form the object light O and the reference light R.

In some embodiments, the above light-emitting unit S1 may be a laser unit. For example, the light-emitting unit S1 may be various laser emitters such as a gas laser emitter, a carbon dioxide laser emitter, a liquid-state laser emitter, a solid-state laser emitter or a semiconductor laser emitter. In other embodiments, the light-emitting unit S1 also may be an LED (Light-Emitting Diode) lamp or an incandescent lamp, and the instant disclosure is not limited thereto.

Figure 4:
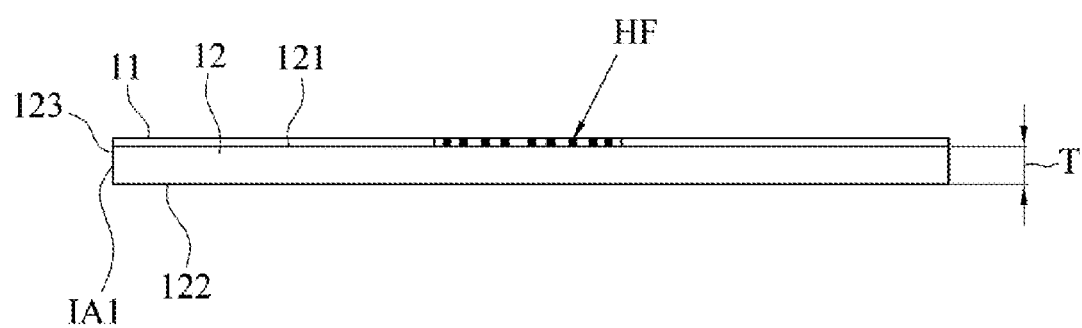
FIG. 4 is an interference schematic diagram of one embodiment of a holographic image recording method of the instant disclosure.

As shown in FIG. 2 again, after the irradiation step S02, the recording step S03 may be executed: the total internal reflected light TR1 and the object light O have a mutual interference to generate a holographic image interference line HF, and the holographic image interference line HF is recorded on the holographic negative film 11 in a photosensitive manner. As shown in FIGS. 3 and 4, specifically, the object light O emitted by the target object 3 and the total internal reflected light TR1 in the transparent substrate 12 have the mutual interference to generate the holographic image interference line HF (for example, ripples or a pattern composed of bright spots and dark spots, and the instant disclosure is not limited thereto). The holographic image interference line HF may comprise all information (such as amplitude and phase) of the object light O, and is recorded on the holographic negative film 11, so that the holographic image interference line HF may be irradiated by a light source subsequently to reconstruct a holographic image corresponding to the target object 3.

In some embodiments, as shown in FIGS. 2 and 3, in the irradiation step S02, a plurality of reference light beams R may be emitted into the transparent substrate 12 from different angles and undergo multiple times of total reflections, thereby recording a plurality of groups of holographic image interference lines HF on the holographic negative film 11, so as to be corresponding to different angles of the target object 3 or different target objects 3.

Based on the above, according to the holographic image recording method of the embodiment of the instant disclosure, the reference light R is emitted into the transparent substrate 12 and undergoes multiple times of total reflections to form the total internal reflected light TR1, and the total internal reflected light TR1 and the object light O have the mutual interference to generate the holographic image interference line HF which is recorded on the holographic negative film 11 in the photosensitive manner, so that during the subsequent reconstruction, the holographic image may be reconstructed through the total internal reflected light without considering a height position of a reconstruction light source, the volume and thickness of the holographic image reconstruction device are greatly reduced, and the holographic image reconstruction device is thinner. A holographic image reconstruction method of the embodiment of the instant disclosure is described in detail below in combination with the drawings.

Figure 7:
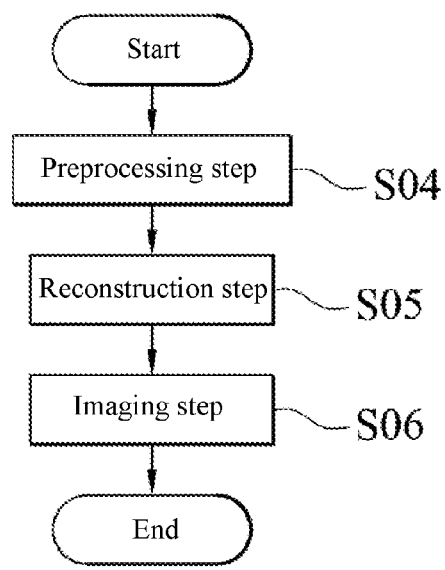
FIG. 7 is a step flowchart of one embodiment of a holographic image reconstruction method of the instant disclosure.

FIG. 7 is a step flowchart of one embodiment of a holographic image reconstruction method of the instant disclosure. The holographic image reconstruction method is used to reconstruct a holographic image corresponding to a target object 3. As shown in FIG. 7, the holographic image reconstruction method of the present embodiment comprises a preprocessing step S04, a reconstruction step S05 and an imaging step S06. In some embodiments, all the steps of the above holographic image reconstruction method may be executed by a holographic image reconstruction device 2. Detailed steps of the holographic image reconstruction method are described below in combination with the drawings.

Figure 8:
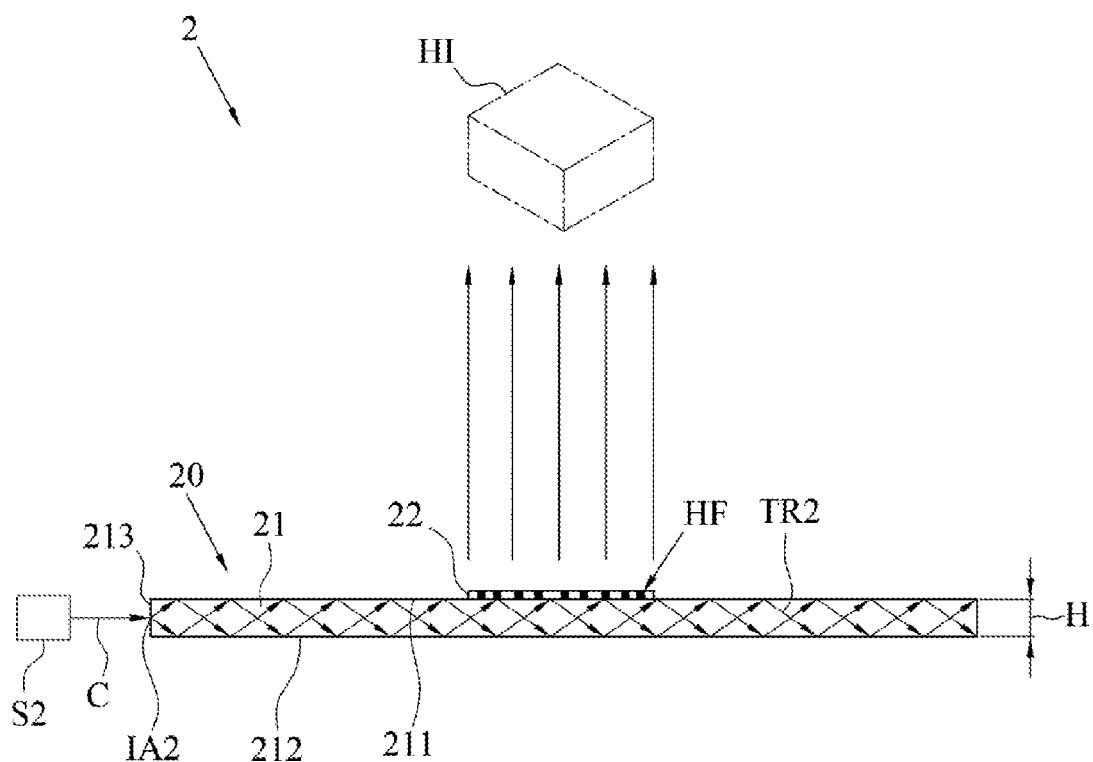
FIG. 8 is a reconstruction schematic diagram of one embodiment of a holographic image reconstruction method of the instant disclosure.

As shown in FIG. 7, in the preprocessing step S04, firstly, a holographic image film 20 is prepared, wherein the holographic image film 20 comprises a light transmission layer 21 and a holographic layer 22. For example, as shown in FIG. 8, the light transmission layer 21 of the holographic image film 20 may be specifically made of a light guide material. For example, the light transmission layer 21 may be made of PC, PMMA or glass, and thus has a light guide function. The holographic layer 22 may record the holographic image interference line HF recorded on the holographic negative film 11 manufactured in the above holographic image recording method. That is, the holographic layer 22 may be a holographic film copied by the holographic negative film 11. For example, in a copying process, the holographic negative film 11 (a master slice) may be in close contact with the holographic layer 22 to be copied, then is exposed through laser irradiation, and is subjected to developing and fixation programs, so as to copy a holographic layer 22 having the holographic image interference line HF recorded on the holographic negative film 11. Or, in another embodiment, the holographic negative film 11 also may copy a holographic layer 22 having the holographic image interference line HF recorded on the holographic negative film 11 in a way of rolling, flat pressing, injection molding and the like.

As shown in FIG. 8 again, the light transmission layer 21 of the holographic image film 20 comprises a first surface 211 and a second surface 212 which are opposite. The first surface 211 and the second surface 212 are spaced from each other by a height H. That is, the light transmission layer 21 is a layer body having a thickness. In the present embodiment, the holographic layer 22 is located on the first surface 211, but the instant disclosure is not limited thereto. The holographic layer 22 also may be located on the second surface 212. Moreover, the light transmission layer 21 also comprises a side edge surface 213 and an incident area IA2. The side edge surface 213 is connected with the outer circumferences of the first surface 211 and the second surface 212. That is, the side edge surface 213 is an outer circumferential surface of the light transmission layer 21. The incident area IA2 may be arranged on the first surface 211, the side edge surface 213 or the second surface 212. In other words, the incident area IA2 may be a partial surface of the first surface 211, the side edge surface 213 or the second surface 212.

As shown in FIG. 7, after the preprocessing step S04, the reconstruction step S05 may be executed: reconstruction light C is emitted into the light transmission layer 21 through the incident area IA2. For example, as shown in FIG. 8, in the present embodiment, the incident area IA2 of the light transmission layer 21 is arranged on the side edge surface 213, and the holographic image reconstruction device 2 comprises a light-emitting unit S2. The reconstruction light C may be emitted by the light-emitting unit S2. The light-emitting unit S2 is adjacent to the incident area IA2, and may emit the reconstruction light C into the light transmission layer 21 from the incident area IA2. Moreover, the reconstruction light C further undergoes multiple times of total internal reflections (TIR) in the height H of the light transmission layer 21 to form total internal reflected light TR2. The total internal reflected light TR2 herein is a sawtooth-shaped reflection path. In some embodiments, the height H of the light transmission layer 21 is preferably equal to or greater than the double of a wavelength of the reconstruction light C, so that the reconstruction light C may undergo multiple times of total internal reflections in the height H of the light transmission layer 21 more smoothly.

However, the above embodiment of FIG. 8 is only an example. In other embodiments, the reconstruction light C also may be emitted into light transmission layer 21 from the first surface 211, the second surface 212 or a corner of the light transmission layer 21. Moreover, the reconstruction light C also may be emitted into the light transmission layer 21 via a reflection light path, a refraction light path or a diffraction light path (such as light path types of FIG. 5 or 6) in addition to being directly emitted into the light transmission layer 21.

In some embodiments, the above light-emitting unit S2 may be various laser emitters to emit a laser ray. The laser ray may be a gas laser ray, a liquid-state laser ray, a solid-state laser ray or a semiconductor laser ray, and may be visible or invisible light. In other embodiments, the light-emitting unit S2 also may be an LED lamp or incandescent lamp. In some embodiments, the reconstruction light C and the reference light R of the holographic image recording method may have the same or different optical characteristics (such as wavelength, frequency or color), and the instant disclosure is not limited thereto.

As shown in FIG. 7, after the reconstruction step S05, the imaging step S06 may be executed: the total internal reflected light TR2 irradiates the holographic image interference line HF to form a holographic image HI. As shown in FIG. 8, specifically, the holographic image interference line HF on the holographic layer 22 of the holographic image film 20 is generated by the above holographic image recording method, namely generated by the mutual interference between the object light O reflected and emitted by the target object 3 and the total internal reflected light TR1 inside the transparent substrate 12. Therefore, the total internal reflected light TR2 formed by multiple times of total internal reflections of the reconstruction light C in the height H of the light transmission layer 21 irradiates the holographic image interference line HF and is diffracted, so as to form the holographic image HI corresponding to the target object 3 (as shown in FIG. 3) on one side of the holographic image film 20. In some embodiments, the holographic image HI may be a virtual image or real image, which depends on the incident direction of the reconstruction light C.

Therefore, according to the holographic image reconstruction method of the embodiment of the instant disclosure, the reconstruction light C is emitted into the light transmission layer 21 and undergoes multiple times of total reflections to form the total internal reflected light TR2, and the total internal reflected light TR2 irradiates the holographic image interference line to form the holographic image HI, so that the holographic image reconstruction device 2 does not need to consider the height position of the light-emitting unit S2. For example, the light-emitting unit S2 in FIG. 8 may be adjacent to the holographic image film 20, so as to greatly reduce the volume and thickness of the holographic image reconstruction device 2 to facilitate thinning.

Although the instant disclosure has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A holographic irrrage recording method, comprising:
   a preparation step:
      stacking a holographic negative film on a transparent substrate, wherein
         the transparent substrate comprises a first surface, a second surface and at least one light entering area,
         the first surface and the second surface are spaced from each other by a thickness of the transparent substrate, and
         the holographic negative film is stacked on the, first surface or the second surface;
   an irradiation step:
      emitting object light and at least one reference light, wherein
         the object light irradiates the first surface of the transparent substrate, and
         the at least one reference light irradiates the at least one light entering area to enter the transparent substrate, the thickness of the transparent substrate being equal to twice of a wavelength of the reference light, such that the reference light undergoes multiple times of total reflections in the thickness to form total internal reflected light; and
   a recording step:
      generating a holographic image interference line fry a mutual interference bret ween the total internal reflected light and the object light, and
      recording the holographic image interference line on the holographic negative: film in a photosensitive manner.

2. The holographic image recording method according to claim 1, wherein the transparent substrate in the preparation step also comprises a side surface; the side surface is connected with the outer circumferences of the first surface and the second surface; and the at least one light entering area is arranged on the side surface, the first surface or the second surface.

3. A holographic image film, comprising a holographic layer, wherein the holographic layer records the holographic image interference line on the holographic negative film manufactured in the holographic image recording method according to claim 2.

4. The holographic image recording method according to claim 1, wherein the object light and the at least one reference light in the irradiation step are coherent light beams.

5. The holographic image recording method according to claim 4, wherein the object light and the at least one reference light in the irradiation step are respectively generated by light emitted by one light-emitting unit and irradiating a beam splitter.

6. A holographic image film, comprising a holographic layer, wherein the holographic layer records the holographic image interference line on the holographic negative film manufactured in the holographic image recording method according to claim 5.

7. A holographic image film, comprising a holographic layer, wherein the holographic layer records the holographic image interference line on the holographic negative film manufactured in the holographic image recording method according to claim 4.

8. A holographic image film, comprising a holographic layer, wherein the holographic layer records the holographic image interference line on the holographic negative film manufactured in the holographic image recording method according to claim 1.

9. A holographic image reconstruction method, comprising:
 a preprocessing step:
  preparing a holographic image film, wherein
   the holographic image film comprises a light transmission layer and a holographic layer, the light transmission layer comprises a first, surface, a second surface and an incident area,
   the first surface and the second surface are spaced from each other by a height of the light transmission layer, and
   the holographic layer is stacked on the first surface and records a holographic image interference line;
 a reconstruction step:
  emitting reconstruction light into the light transmission layer through the incident area, the height of the light transmission layer being equal to twice of a wavelength of the reconstruction light, such that the reconstruction light performs multiple times of total reflections in the height to form total internal reflected light; and
 an imaging step:
  irradiating, by the total internal reflected light, the holographic image interference line to form a holographic image.

10. The holographic image reconstruction method according to claim 9, wherein the light transmission layer in the preprocessing step also comprises a side edge surface; the side edge surface is connected with the outer circumferences of the first surface and the second surface; and the incident area is arranged on the side edge surface, the first surface or the second surface.

11. The holographic image reconstruction method according to claim 9, wherein the reconstruction light in the reconstruction step is emitted by a light-emitting unit, and the light-emitting unit is adjacent to the incident area.

* * * * *